Aug. 5, 1952 P. R. ROSE Re. 23,535

APPARATUS FOR DRYING WARP AND THE LIKE

Original Filed May 7, 1948 2 SHEETS—SHEET 1

INVENTOR
PAUL R. ROSE

BY
Kniesner Hoag & Carlson
ATTORNEYS

APPARATUS FOR DRYING WARP AND THE LIKE

Original Filed May 7, 1948 2 SHEETS—SHEET 2

INVENTOR
PAUL R. ROSE
BY
Kniessner Hoag & Carlson
ATTORNEYS

Reissued Aug. 5, 1952 Re. 23,535

UNITED STATES PATENT OFFICE 23,535

APPARATUS FOR DRYING WARP AND THE LIKE

Paul R. Rose, East Orange, N. J., assignor to Bachmann Uxbridge Worsted Corporation, Uxbridge, Mass., a corporation of Delaware Original No. 2,541,383, dated February 13, 1951, Serial No. 25,565, May 7, 1948. Application for reissue December 13, 1951, Serial No. 261,427

5 Claims. (Cl. 34—159)

Matter enclosed in heavy brackets [ ] appears in the original patent but forms no part of this reissue specification; matter printed in italics indicates the additions made by reissue.

This invention relates to a drier.

An object of the invention is to provide a drying unit adapted for drying sized webs and the like, which will occupy a minimum of space on a mill floor and through which a web can be run from rear to front, and which is capable of cooling rapidly when the travel of the web is stopped for any reason.

Another object of the invention is to provide means for efficiently using a supply of drying air to dry a web of textile material.

Another object of the invention is to provide improved means for directing a tempering air to and through a web of textile material.

Another object of the invention is to control the stretch of the web while it is being dried and prevent the transfer of size from and to the web.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a side elevation, partly in cross section with some parts broken away;

Figure 1:
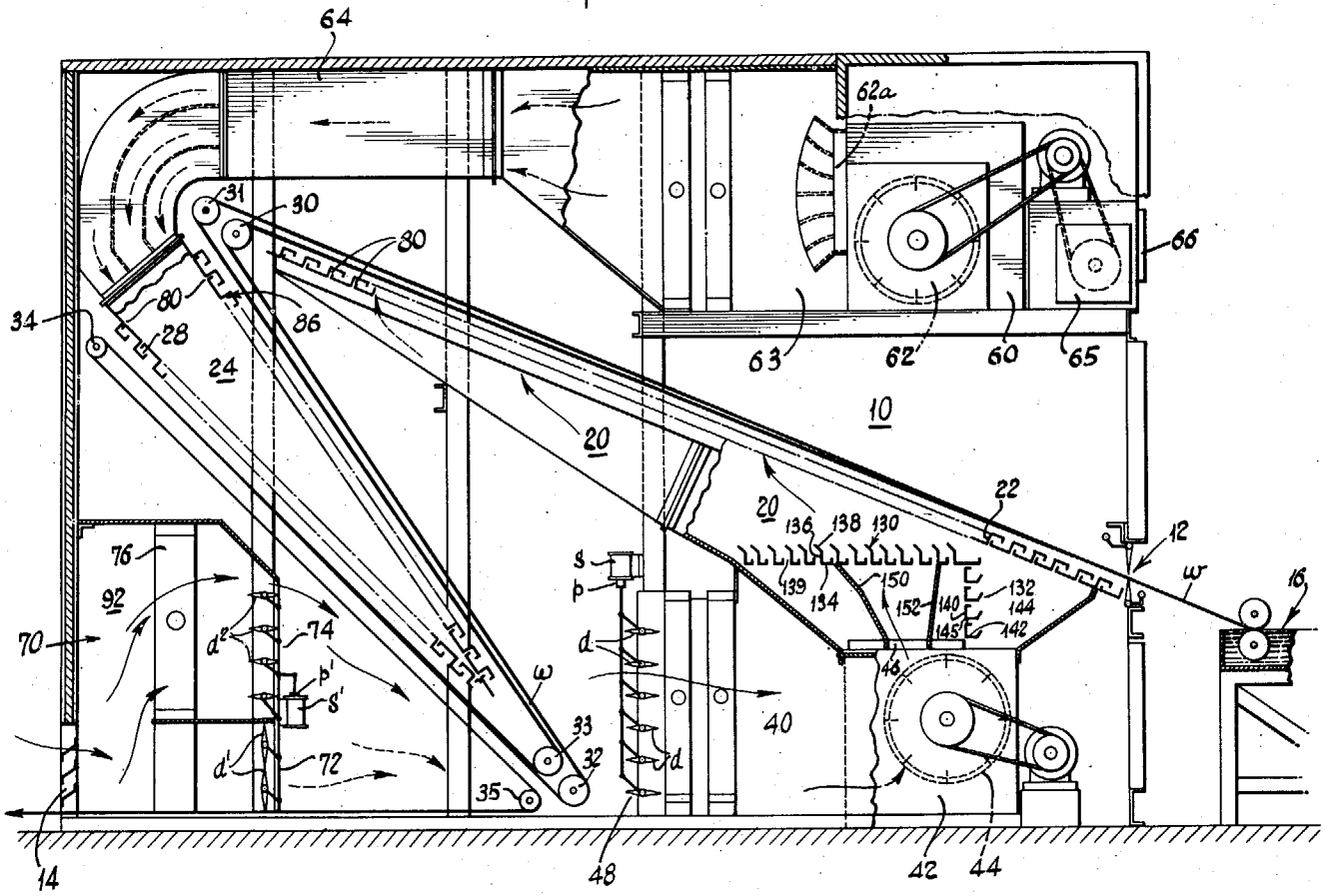

In the embodiment of the invention disclosed herein a closed chamber 10 is provided into which a web w of textile material is introduced through the port 12 in the rear wall and from which the web w is discharged through the air inlet port 14 in the front wall. Before entering closure 10 the web passes through a sizing bath and rolls, indicated generally by the numeral 16.

Within closure 10 is provided an elongated single header 20 having in its upper surface 22 a series of air ports 80, to be more fully described, and a double header 24 which is substantially V-shaped and has in its opposite surfaces 26 and 28 respectively a series of ports 80. Header 20 extends upwardly from just below entrance port 12 toward the top of the front wall of closure 10, and header 24 extends downwardly and forwardly from adjacent the inner and narrower end of header 20 with its wider end adjacent the inner end of header 20. Thus the headers 20 and 24 are angularly related and so that an initial long reach and a plurality of shorter reaches of the web may be provided in a relatively small closure. Two rollers 30 and 31 are provided in spaced relation longitudinally of header 20, beyond the inner end of single header 20, and two rollers 32 and 33 are provided in spaced relation longitudinally of header 24, beyond the narrow end of double header 24, and the web w is led from the sizing bath 16 through entrance port 12 through the long reach to and around rollers 30 and 31 in a path parallel and adjacent to the upper surface of header 20, and then around rollers 32 and 33 and through two shorter reaches parallel to the opposite surfaces of header 24. The web is thus divided between the two rollers 30 and 31, the part passing over rollers 30 and 32 being separated or "split" from the part passing over rollers 31 and 33 all the way from the sizing bath to the single roller 34 which is positioned below the wider end of header 24 and receives and reunites the web after it has passed from rollers 32 and 33 over the air ports 28. From single roller 34 the web travels back around roller 35 and out of air inlet port 14 in the front wall of casing 10, thus moving through and counter to the entering stream of air, which thus serves to cool the web before it leaves casing 10, and thus eliminating the objectionable steam and vapor given off by the sized web on leaving drying units for slashers of the prior art types.

Within closure 10 an air heating chamber 40 is provided communicating with a chamber 42 housing air impeller or fan means 44, and having the discharge port 46 communicating with single header 20. The air is distributed within header 20 and discharged therefrom as will be described. In the entrance port 48 of chamber 40 there is provided a series of vanes or dampers d by which the air flow into chamber 40 may be controlled. The vanes or dampers may be connected to a plunger p controlled by a solenoid motor S. These and other dampers and solenoid motors referred to herein by similar reference characters are not further described since they are well known and commercially available and no claim is made to them per se.

Above the single header 20 a chamber 60 is provided within closure 10, said chamber being open at the bottom and housing the air impeller means or fan 62 which communicates through port 62*a* with the air heating chamber 63, which in turn communicates with the duct 64 leading to the wider end of double header 24, and the air impeller means 65 positioned between fan 62 and the end wall of closure 10 in which is provided the outlet ports 66.

The headers 20 and 24 and duct 64 extend substantially the full width of closure 10 and it will be understood that air from single header 20, after passing through web w, rises toward and is directed to chamber 60, where the increment that has passed through the wettest part of the web will be discharged from closure 10 through air impeller 65 and outlet ports 66 and the remainder will be impelled through airheating chamber 63 to the double header 24. From the double header 24 air discharged through the two series of ports 26 and 28 flows back, under single header 20 to chamber 40 and the above described air flow cycle is repeated, an increment of the air being dicharged from closure 10 during each cycle, as has been described, and new air being continually supplied into closure 10 through air inlet port 14.

In the front of closure 10, preferably substantially on a level with chamber 40, a vestibule 70 is provided in communication with the air external to closure 10 through port 14. The inner wall of vestibule 70 comprises the ports 72 and 74 facing toward the inlet of chamber 40. Lower port 72 is controlled by vanes or dampers d′ and upper port 74 is controlled by vanes or dampers $d^2$ both conveniently attached to control plunger p′ which may be controlled by solenoid s′. Dampers d′ set at right angles to dampers $d^2$ so that when one set is fully open the other set will be fully closed.

Within vestibule 70 is located a heater 76 disposed so that air passing into chamber 10 through the upper port 74 in the inner wall of vestibule 70 will be heated by it. When vanes or dampers 74 are closed air will pass into chamber 10 through the lower port 72 of the inner wall of vestibule 70 and will not come into contact with heater 76, and will thus have the temperature of the air external to chamber 10.

Suitable known means may be employed for actuating the web to travel at a plurality of different speeds, as for example at high speed, and at very low speed known in the trade as at "crawl"; for stopping the warp altogether and for starting and stopping the air impeller means and controlling the vanes or dampers controlling the air flow to the air heating means, as for example through suitable electric circuits (not shown). When the web is travelling at full speed inlet port 72 is desirably closed and ports 74 and 48 open; and heated air continuously circulated, and distributed against the web through headers 20 and 24.

When the web is stopped ports 74 and 48 are closed and port 72 is opened causing air at room temperature to flow through the closure 10 and out exhaust ports 66, by-passing chamber 40, and speedily cooling the interior of closure 10 by replacing the heated air therein. If it is desired to have the web move at the crawl the vanes or dampers of either port 74 or port 48, or both, may be partially opened to permit some heating of the air within closure 10.

When the slasher is in operation air is supplied under pressure into header 20 and discharged so that it contacts evenly at long single reach of the web. It then enters header 24 and discharged so that it contacts evenly two shorter reaches of the web, after which it is adjacent to chamber 40 and enters it to be recirculated. The headers are disposed to facilitate circular flow within closure 10 and even distribution of air throughout the width and length of headers 20 and 24. This even distribution is promoted by the taper of the headers and the baffle and port means to be described. These means also coact to provide a gentle even flow of air into contact with the web from along the full length and width of the ported surfaces of the headers.

Figure 2:
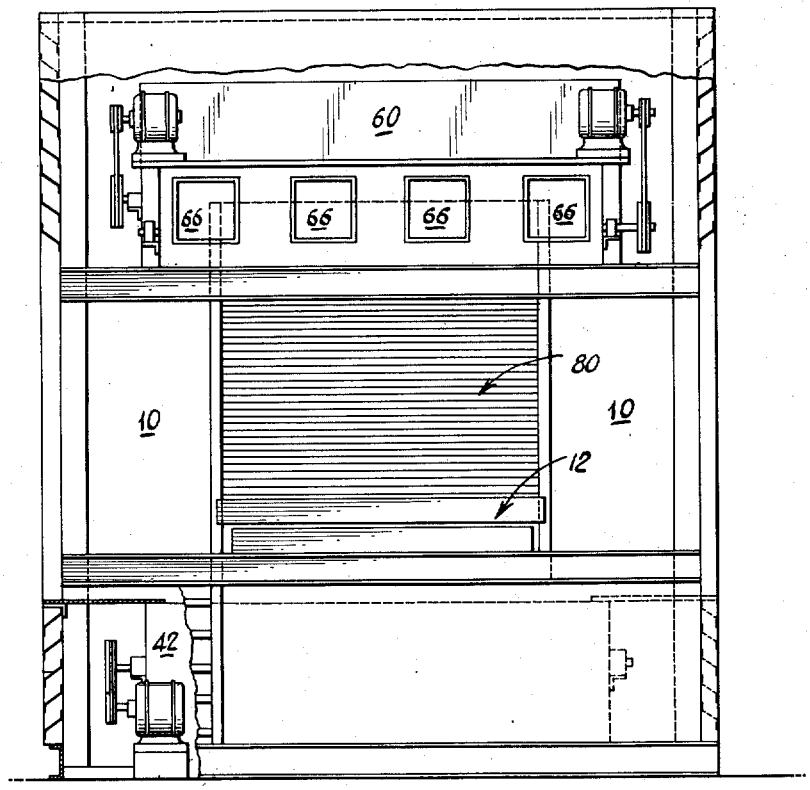
Figure 2 is a front elevation.

The air is discharged from headers 20 and 24 through ports 80 which are disposed along the upper surface of header 20 and along both the upper and lower surfaces of header 24, each port being in the form of a narrow opening extending laterally throughout substantially the full width of the header, as shown in Figure 2. Ports 80 are made small enough to insure that the air in the header will not issue only from a few of these ports but will fill the header and issue from all the ports 80 in streams of substantially equal volume. Each discharge port has associated with it a laterally extending baffle 82 extending over the port and bent back at right angles at a distance from the port greater than the width of the port. Thus air passing out of a port 80 is deflected and its direction of flow is reversed and its speed slowed down. The direction of flow is again reversed when the air is deflected by the upper surface of the header between the ports, and flows toward the web w through the space between adjacent baffle members. The space between the front of one baffle member and the rear of the adjacent member is made greater than that between the port and the bent over end of the baffle so that the speed of the air is again reduced. This double reversing of the direction of flow and the two stage slowing down of the air flow serves to effectively prevent and reduce turbulence and to equalize air flow across the width of the header even though it may have been introduced into the header under irregular distribution so that the air contacts the web with a smooth gentle even flow and does not stretch the web or cause the individual threads to contact and roll around each other. When the threads or yarns comprising a web are caused, after being treated with a sticky substance such as sizing material, to contact and cross with other threads or yarns of the web they tend to adhere to one another thus making the subsequent processing of the web extremely difficult. After the sizing step the web is run through a comb or reed before being wound upon a loom beam and when threads or yarns comprising the web are stuck together it becomes very difficult if not impossible to run the web through a comb or reed. It is well known that a stream of air delivered from a fan blower varies widely in pressure over different portions of its cross sectional area and from moment to moment in the same portions, and this pressure and consequent velocity variations have been heretofore very troublesome. One of the deficiencies of prior art devices is that in order to prevent the drying air employed from causing the sized individual threads or yarns of a web to be forced into contact or crossed with one another by pressure and velocity variations of the drying air and thus stuck together they have employed an insufficient volume of drying air to do an efficient job of drying. The device disclosed herein, due to its ability to reduce turbulence and deliver the drying air to the web with a smooth gentle flow, has the important advantage that it may be employed to deliver a sufficient volume of drying air to effect a speedy and uniform drying of the web.

Figure 3:
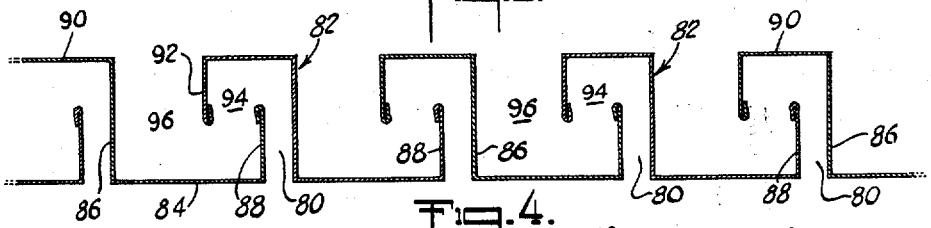
Figure 3 is a detail of the discharge ports of the headers.

As shown in Figures 1 and 3 the ports 80 are defined by the baffle members 82 each of which comprises an inner imperforate portion 84 *or first part* defining a header surface, a portion 88 *or second part* extending substantially at right angles to portion 84 from one end of portion 84 and defining one side of a port 80, a portion 86 *or third part,* extending substantially at right angles to portion 84 from the other end of portion 84 and substantially parallel to portion 88 but longer than 88, a portion 90 substantially at right angles to portion 86 and thus substantially parallel to portion 84 but extending in the opposite direction, and a portion 92 bent back at right angles to portion 90 and thus substantially parallel to, although shorter than, portion 86. The members 82 are arranged in overlapping relation so that portion 88 of one member and portion 86 of the next member define between them a port 80, and the portion 90 connected to said portion 86 projects over the port at a distance therefrom. The adjoining portions 86 and 88 of two baffle members 82 thus define a port 80 which is elongated and opens into a channel 94 which is wider than port 80, preferably on the order of twice the width of port 80. From channel 94 the air, after having been reversed in direction of flow by striking against portions 90 and 92, passes into a channel 96, which is of greater area than channel 94 being preferably on the order of from one-half again to twice as wide as channel 94. From channel 96 the air passes to the web, after having been again reversed in direction by striking against portions 84 and 88 of the adjacent member 82.

Figure 4:
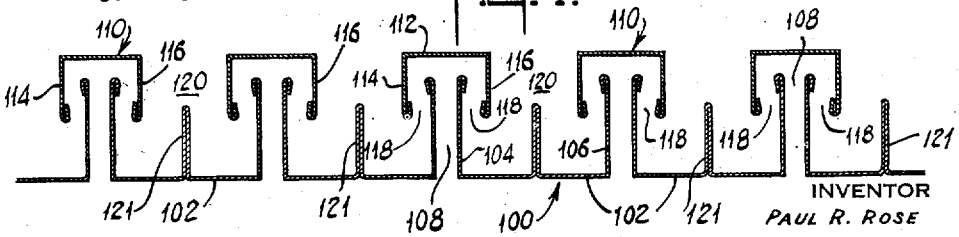
Figure 4 is a detail of a modified form of discharge ports of the headers.

In Figure 4 a modification of the air port structure is shown comprising two sets of angle members. The angle members 100 are arranged similarly, in spaced relation, their intermediate portions 102 *or first parts* defining a header surface and their adjacent outwardly extending ends *or second and third parts* 104 and 106 defining elongated ports 108. Bridging the ports 108 are angle members 110 *or fourth parts* disposed with their intermediate portions 112 extending over the ports respectively but spaced therefrom a distance on the order of the width of the ports, and with their end portions 114 and 116 extending inwardly toward portions 102, and defining channels 118 between themselves and the portions 104 and 106 respectively but spaced from the sides of ports 108 by a distance on the order of the width of the ports 108. Thus each port 108 discharges into two channels 118 each substantially equal in area to port 108 and together providing a space approximately double that of the port 108.

The ports 108 are spaced apart so that the distance between leg 114 of one angle member 110 and the leg 116 of the adjacent member 110 is substantially greater than the combined width of the two ports 118 which communicate with each port 108, being preferably twice that of said two ports 118 combined. The air from each port 108 is thus expanded and slowed down in passing from ports 108 to ports 118 as well as reversed in direction of flow, and the expansion and slowing down is repeated when the air passes from ports 118 to the spaces 120, and the direction of flow of the air is again reversed. The reduction in pressure and slowing down of the air and the changing of its direction of flow cause the air to be delivered to the web in a smooth, gentle and even flow.

Preferably partition members 121 are provided extending at right angles to the intermediate members 102 of angle members 100 midway between adjacent ports 108. The distance between a partition member 121 and the leg 114 of member 112 which is on one side, and the distance between the partition 121 and the leg 116 of member 112 which is on the other side, is desirably substantially greater than the width of the channels 118 respectively. As indicated in Figure 4 the partition members may extend outwardly toward the web sufficiently to overlap the adjacent end portions 114 and 116 respectively of adjoining bridging angle members 110. The partitions 121 serve to prevent mixing of the air discharged through channel 118 of one port with the channel 118 of the adjoining port prior to the time the final direction of flow to the warp is established. Thus in effect two volumes or streams of air rise through the space 120 and are directed toward the web without interference or cross currents.

Within header 20 means are provided for distributing widthwise and lengthwise of the header the air delivered to it from chamber 42, thus cooperating with ports 80 or 108, said means comprising baffles 130 and 132. Baffles 130 are disposed along a line substantially parallel with the top of chamber 40, and baffles 132 are arranged along a line at right angles to the top of chamber 40 and at the side of the port leading from chamber 40 which is adjacent to the rear end of the header.

Baffles 130 each comprise a base 134, a portion 136 extending substantially at right angles to the base, and an inclined outer end portion 138. The spaces between adjoining bases are ports 139. These ports 139 have a width equal to substantially half the distance between the middle and the front end portions 136 and 138 respectively of the members 130 so that air entering header 20 at high speed and pressure is held back and evenly distributed between ports 139 and is then slowed down and expanded upon passing into the wider area between portions 136, and at the same time is deflected toward the upper end and middle portions of the header by the inclined outer end portions 138.

Baffles 132 each comprise a base 140, a portion 142 substantially normal to the base, and an outer end portion 144 inclined toward the header ports which are nearest the port 12 through which the web enters closure 10. The spaces between adjoining bases are ports 145 the width of which is less than, preferably about one-half, the distance between the portions 142, or the portions 144 of adjoining members so that the air in passing into the main portion of header 20 is first restricted by ports 145 and then expanded and slowed down upon passing into the wider area between the portions 142, and 144 respectively of adjoining members 132, and is then deflected by the end portions 144 toward the ports 80.

The space in header 20 between chamber 40 and the members 130 and 132 is divided by partitions 150 and 152 thus dividing the air flow from chamber 40 into three streams directed respectively to the upper end, the middle and the lower end of the header. The partitions cooperate with the means described above to distribute the air widthwise and lengthwise of the header and to prevent eddies.

The means described serve to cut down the speed of flow of the air after it enters header 20, and to distribute it evenly so that it is discharged from all the ports 80 in substantially the same volume, and is spread out and caused to contact the web evenly throughout its length and without distorting or stretching the web.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. A drier comprising a closure, a header therein having a number of ports disposed at spaced intervals along a surface thereof, means for leading a web into said closure and along a path adjacent to and substantially parallel with the ported surface of the header, means for providing a flow of air into and out of the closure and simultaneously circulating air within the closure including means for delivering the air under pressure into said header, and means for distributing the air within the header and causing it to be discharged from said ports substantially equally in a nonturbulent flow said means each comprising a number of parallel connected passages extending alternately in opposite directions, said passages being of successively greater cross sectional area.

2. An air distributing header having a discharge wall comprising a series of baffles extending laterally thereof, each baffle comprising a first part defining an imperforate wall member of said header, a second part projecting outwardly from said imperforate part a relatively short distance, and a third part projecting outwardly from said imperforate part a relatively long distance and then substantially parallel to said discharge wall and spaced from the outer edge of the said second part of a neighboring baffle and then inwardly and terminating spaced from said first part, each pair of said baffles defining between them a first relatively narrow outwardly extending passage between the outwardly extending second and third parts respectively of adjacent baffles, a second passage between the outer edge of the said second part of one baffle and the said parallel portion of the said third part of the adjacent baffle, a third passage between the adjacent edges of said second part and the inwardly turned portion of the said third part of an adjacent baffle, a fourth passage between the edge of the inwardly turned portion of said third part of one of said baffles and the first part of the other baffle, and a fifth passage between the edge of the inwardly turned portion of said third part of one of said baffles and the outwardly extending portion of the third part of said adjacent baffle, said fifth passage being substantially wider than said first passage.

3. The device as claimed in claim 2 in which said second and third passages are of greater area than said first passage, and said fourth and fifth passages are of progressively greater area than said second and third passages.

[4. An air distributing header having a discharge wall comprising a series of nozzles extending laterally thereof each nozzle comprising, a first part defining an imperforate end wall of said header second and third parts projecting from said first part substantially equal distances, and a fourth part having a central portion extending over and in spaced relation to the outer ends of said second and third parts respectively and having end portions bent in planes substantially parallel with said second and third parts respectively but extending only part way back to said first part, and a partition member extending outwardly from said first part intermediate the second and third parts respectively of adjacent nozzles and together with the adjacent portions of said first part and the proximate end portions of the fourth parts of said nozzles respectively forming elongated air passages substantially parallel to the passages provided by said second and third parts.]

*5. An air distributing header having a discharge wall comprising a series of nozzles extending laterally thereof each nozzle comprising, the adjacent end portions of two adjacent members each comprising a first intermediate part defining an imperforate end wall of said header, second and third parts projecting from the respective ends of said first part substantially equal distances, the first parts of said adjacent members being aligned, and an imperforate member comprising a fourth part having a central portion extending over and in spaced relation to the outer ends of the adjacent second and third parts respectively of said two adjacent members and having end portions bent in planes substantially parallel with said second and third parts respectively but extending only part way back to the said first parts, of said adjacent members.*

*6. An air distributing header having a discharge wall comprising a series of nozzles extending laterally thereof each nozzle comprising, the adjacent end portions of two adjacent members each comprising a first intermediate part defining an imperforate end wall of said header, second and third parts projecting from the respective ends of said first part substantially equal distances, the first parts of said adjacent members being aligned, and an imperforate member comprising a fourth part having a central portion extending over and in spaced relation to the outer ends of the adjacent second and third parts respectively of said two adjacent members and having end portions bent in planes substantially parallel with said second and third parts respectively but extending only part way back to the said first parts, of said adjacent members and partition members extending outwardly from each of said first parts and together with the proximate end portions of adjacent fourth parts forming elongated air passages substantially par-*

*allel to the passages provided by adjacent second and third parts.*

PAUL R. ROSE.

REFERENCES CITED

The following references are of record in the file of this patent or the original patent:

UNITED STATES PATENTS

| Number | Name | Date |
|---|---|---|
| 585,895 | Toale | July 6, 1897 |
| 877,736 | Ripley | Jan. 28, 1908 |
| 1,550,714 | Stacey | Aug. 25, 1925 |
| 1,605,264 | Millard | Nov. 2, 1926 |
| 1,799,300 | Kenyon | Apr. 7, 1931 |
| 1,871,819 | Monro | Aug. 16, 1932 |

| Number | Name | Date |
|---|---|---|
| 2,005,600 | Tappen | June 18, 1935 |
| 2,071,015 | Andrews | Feb. 16, 1937 |
| 2,230,203 | Mack et al. | Jan. 28, 1941 |
| 2,265,071 | Hartenbach | Dec. 2, 1941 |
| 2,286,731 | Hanson | June 16, 1942 |
| 2,331,042 | Parkes | Oct. 5, 1943 |
| 2,392,393 | Kennedy | Jan. 8, 1946 |
| 2,439,722 | Dreisel | Apr. 13, 1948 |
| 2,440,648 | Walter et al. | Apr. 27, 1948 |
| 2,541,383 | Rose | Feb. 13, 1951 |

FOREIGN PATENTS

| Number | Country | Date |
|---|---|---|
| 580,646 | Germany | July 14, 1933 |